United States Patent [19]

Thibodeaux

[11] Patent Number: 4,928,352
[45] Date of Patent: May 29, 1990

[54] CRAWFISH PEELING APPARATUS

[76] Inventor: Glenn Thibodeaux, Rte. 3, Box 75-A, Church Point, La. 70525

[21] Appl. No.: 364,808

[22] Filed: Jun. 9, 1989

[51] Int. Cl.$^5$ ............................................. A22C 29/02
[52] U.S. Cl. ............................................. 17/73; 17/48
[58] Field of Search .......................... 17/73, 71, 48, 57

[56] References Cited

U.S. PATENT DOCUMENTS

| | | | |
|---|---|---|---|
| 2,607,951 | 8/1952 | Moree | 17/26 |
| 2,987,759 | 6/1961 | Lapeyre et al. | 17/73 |
| 3,084,379 | 4/1963 | Henning | 17/73 |
| 4,281,436 | 8/1981 | Hoffman et al. | 17/73 |

Primary Examiner—Willis Little
Attorney, Agent, or Firm—Pravel, Gambrell, Hewitt, Kimball & Krieger

[57] ABSTRACT

A crawfish peeling apparatus for separating the crawfish upper and lower tail exoskeleton portions from the soft inner meat product including a frame that supports a feed mechanism for advancing crawfish tails to be peeled along a travel path that traverses a cutter. The cutter includes preferably a pair of spaced apart rotary blades, each pair overlapping in a scissoring fashion so that longitudinal edge cuts can be made along the left and right sides of the crawfish tail and extending substantially the full length of the crawfish tail.

9 Claims, 3 Drawing Sheets

CRAWFISH PEELING APPARATUS

BACKGROUND OF THE INVENTION

1. Field of the Invention

The present invention relates to crustacea peeling apparatus and more particularly relates to a crustacea peeling device which cuts the tail of crawfish on each side of the tail along the edges so that the upper and lower tail exoskeletal portions can easily separate to expose the contained meat product.

2. General Background

Many crustaceans are edible food products that are typically consumed by removing the hard exoskeleton so that the softer meat product can be consumed. Common crustaceans that are used on a nation wide basis as a food product includes of course crabs, lobsters, and some parts of the country, crayfish or crawfish. In in the Southeastern Gulf Coast area, and more particularly in the states of Louisiana, Mississippi and Texas, crawfish are a very important food item which are consumed in vast quantities and, after being cooked in a crab boil, hot sauce or the like, and/or can be included in stews, soups, or fried, for example. While the popularity of crawfish has long existed in a regional portion of the country adjacent the Gulf of Mexico, recently the popularity of Acadian cooking has increased the demand for crawfish.

Several devices have been patented which attempt to process or remove the edible meat from a crustacea tail. U.S. Pat. No. 3,221,363, entitled "Process For Removing The Edible Meats From Crustacea Tails," issued to Couret, provides a process for removing the edible meat from a prawn.

An early patent for picking crayfish is seen in the Roshko U.S. Pat. No. 2,660,754, which uses a machine for separating the meat from the hulls and includes a frame having upper and lower mounted roller members, and the rollers being disposed one substantially vertically above the other with an adjustable tensioning means between the mounting members urging the members together. A water jet spray in front of the apparatus is provided. A continuous rotation is imported to the rollers during operation. The crayfish are fed into the device, tail first one at a time, the head portion of the crayfish having been first removed by hand. As the crayfish enters the device, the hull is cracked and opened with a motion that loosens the meat and the spray from the water jet is directed so that it washes the meat out of the hull, thus assisting the squeezing out action of the rollers. Once the meat is free, the water washes it down over the lower roller and away from the machine, thus preventing any unnecessary mutilation of the separated meat by the rollers. The meat is then caught on the forward side of the machine by a bend, and the hulls are caught in a trough or container at the rear of the rollers.

Some crawfish peeling devices use air pressure as part of the method for removing the meat product from the crustacean shell. In the Ingalls U.S. Pat. No. 3,758,921, entitled "Crawfish Peeler," a machine is provided which automatically peels crawfish or other crustaceans in which the crustacean to be peeled has a head and tail respectively held between grippers on separate conveyors having operative runs which diverge in the direction of their movement. The grippers of the two conveyors are in laterally opposed pairs which are located abreast of and adjacent each other at the loading end of the conveyors to receive the head and tail sections respectively of the crustacean and thereafter separates the head and tail section as they move apart due to the divergence of the operative conveyor runs. The meat retained by the tail section is ejected by shearing off the extremity of the tail section adjacent to movement of the associated conveyor, then injecting a blast of pressurized air into the tail section through the opening formed by such shearing action, and the empty shells are then discharged at the end of each operative run.

Rotary cutting blades are used in the U.S. Pat. No. 3,871,086 issued to Rutledge, entitled "Apparatus For De-Shelling Crustaceans." In the Rutledge patent, de-headed crawfish are passed through parallel cutting blade assemblies composed of concentric blades that may be of equal or unequal height. The apparatus operates by shattering the dorsal shell of the crayfish thus removing the meat product.

A later patent issued to Rugledge, U.S. Pat. No. 4,121,322, entitled "Crustacean Meat Extraction Means" provides a pair of rollers positioned adjacent to one another to form a nip for receiving the crustacean wherein the lower nip is provided with at least one groove for receiving the meat as it is squeezed from the crustacean shell.

A pair of cooperating grooved rollers is described in the Mestayer et al. U.S. Pat. No. 4,196,495, entitled "Crawfish Tail Peeler." The first roller has a concave lateral peripheral edge surface which is opposed at a substantially constant spacing by a convex lateral peripheral edge surface of a second roller, the rollers being rotated in opposite senses to received the exoskeletal portions of the crawfish between the opposing peripheral edge surfaces of the rollers. Rear margins of the flippers of the crawfish are grasped between the counter rotating rollers, the exoskeletal portions covering the tail being pulled between the rollers to peel the exoskeletal portions from the edible portions and to simultaneously devein the crawfish tail.

A more recent U.S. Pat. No. 4,385,422, issued to Ingalls et al., entitled "Crayfish Peeler," provides an apparatus for both de-heading and peeling crawfish comprising pairs of gripper assemblies for operative engagement with the head and tail sections of a crayfish supported for movement in synchronized relation through separate but tangentially related orbits wherein the pairs of grippers simultaneously move in a common direction through or past the point of tangency of their respective orbits wherein the tail holding gripper assemblies each comprise a lower crayfish pan constructed from flexible rubber or plastic having an arcuate cross-section greater than 180° and a top arm member pivotly mounted above the lower pan to hold the crayfish in the pan during the de-heading cycle, the pivoting of top arm member being actuated by a simplied cam assembly. The device uses air pressure to force the meat from the shell of the crustacean.

Many of these prior art devices uses pinch roller arrangements which squeeze or attempt to squeeze the crawfish from the shell. The problem with squeeze rollers is that often the meat itself is damaged along with the shell when the shell is squeezed. Further, the rollers often do not perform as desired wherein they become viscous or fluidized through the accumulation of water upon the rollers during operation. Many of the prior art patents use air pressure in an attempt to force the crawfish from the shell. This is an expensive and cumbersome method in that a timing mechanism must be used to turn on and shut off the air pressure at precisely the correct moment and when the crawfish is properly positioned.

SUMMARY OF THE PRESENT INVENTION

The present invention solves these prior art problems and shortcomings in a simple and straightforward manner by providing a crawfish peeling apparatus that actually separates the dorsal and ventral portions of the tail exoskeleton from the soft meat product without the need for crushing rollers or squeezing or air pressure. The apparatus includes a frame and a scissor cutter in the form of a pair of upper rotary blades and a pair of lower rotary blades which are respectively positioned to engage and cooperate to cut the dorsal and ventral shell sections on both sides of the crawfish tail, making longitudinal edge cuts along the left and right sides of the crawfish tail exoskeleton so that the cut extends substantially the full length of the tail.

In the preferred embodiment, the cutter includes left and right pairs of rotary cutting blades, each respective pair engaging in a scissoring fashion so that the tips of the blades overlap during cutting. Each pair of blades includes an upper rotary blade that is positioned to cut the dorsal portion of the tail section and a lower rotary blade which is positioned to cut the ventral tail section.

In the preferred embodiment, the cutters are positioned in pairs, each pair defining a common plane which is a cutting plane, and each pair of blades simultaneously scissor the crawfish tail on opposite sides during cutting.

BRIEF DESCRIPTION OF THE DRAWINGS

A better understanding of the invention can be had when the detailed description of a preferred embodiment set forth below is considered in conjunction with the drawings, in which.

DETAILED DESCRIPTION OF THE PREFERRED EMBODIMENT

Figure 1:
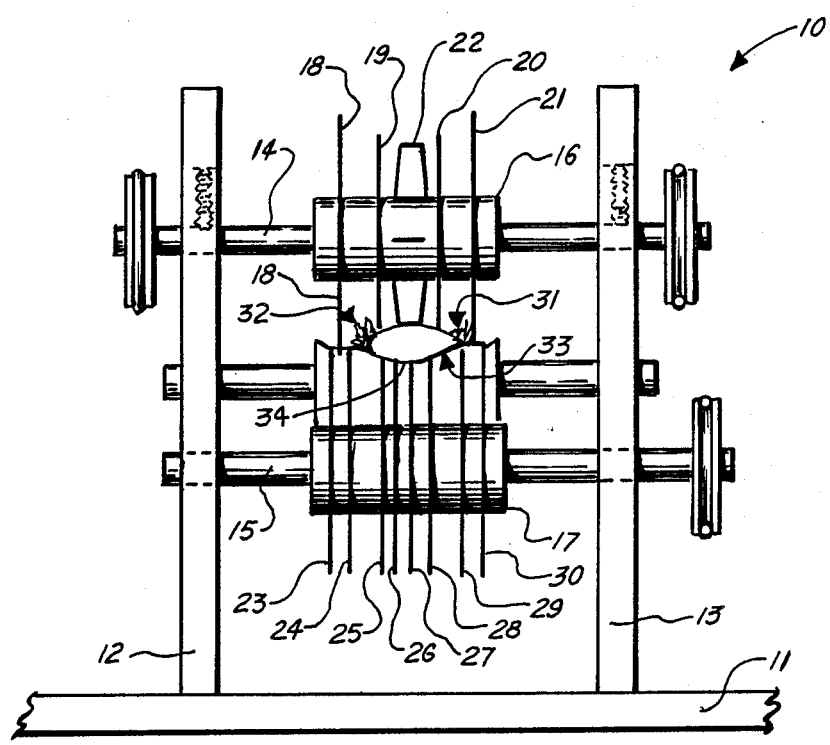
FIG. 1 is a front view of the preferred embodiment of the apparatus of the present invention.
Figure 2:
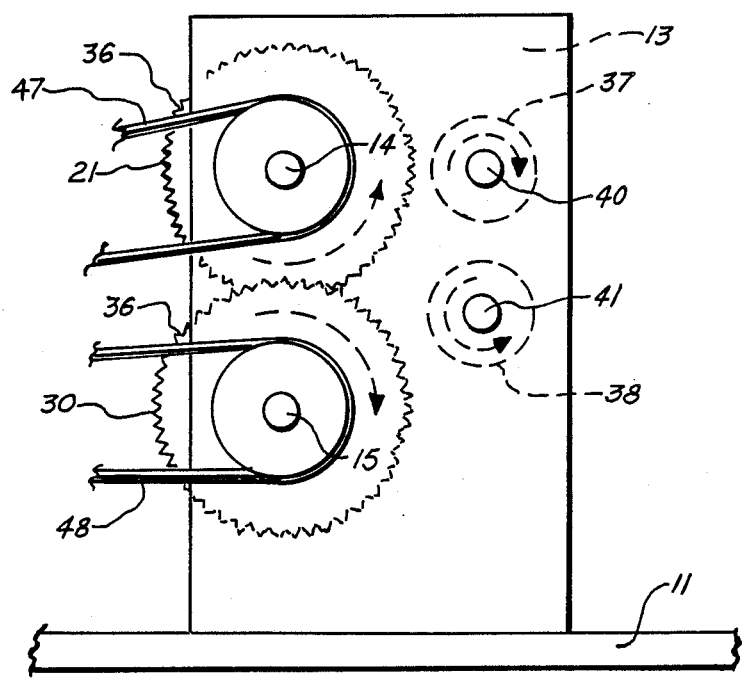
FIG. 2 is a side-fragmentary view of the preferred embodiment of the apparatus of the present invention.
Figure 3:
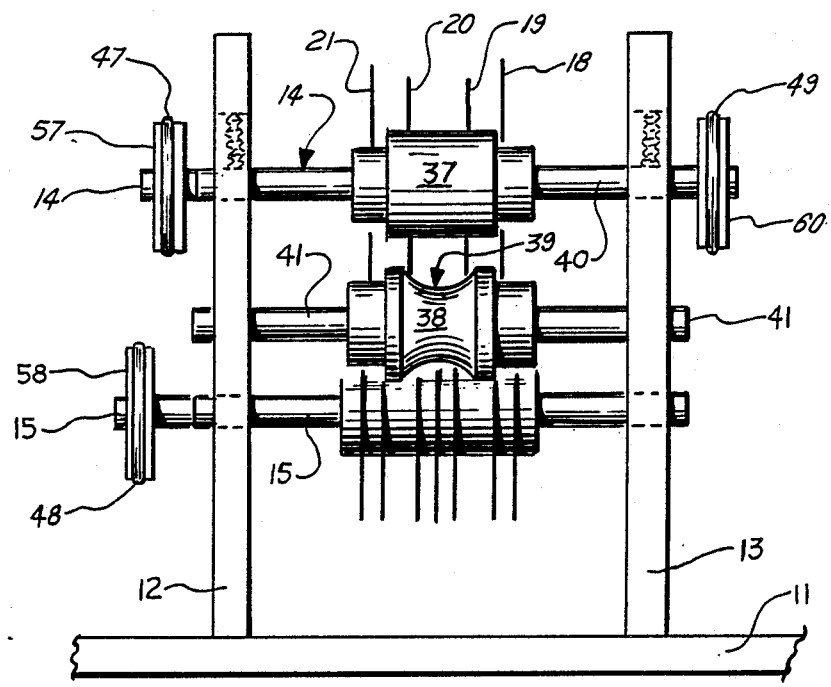
FIG. 3 is a rear view of the preferred embodiment of the apparatus of the present invention.
Figure 4:
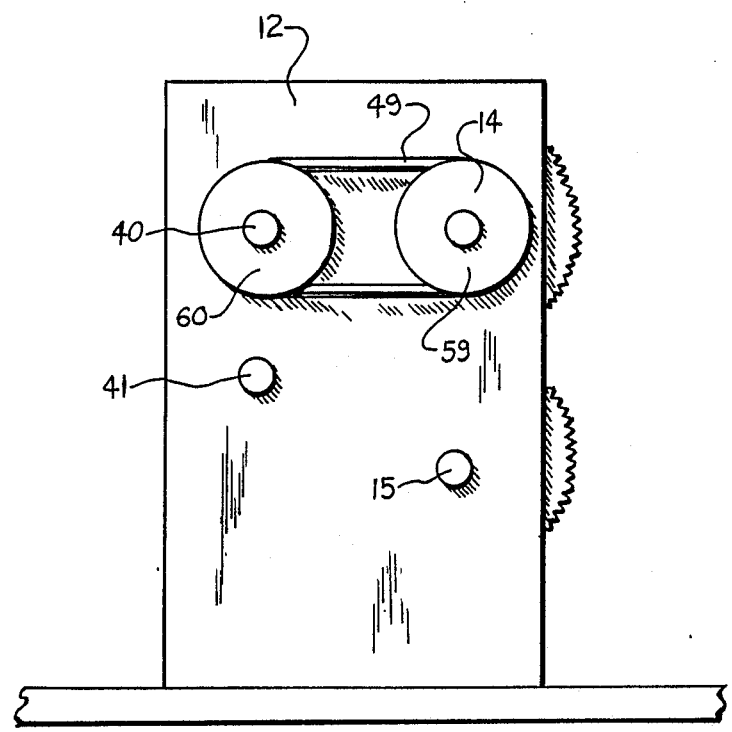
FIG. 4 is a side view of the preferred embodiment of the apparatus of the present invention.

FIGS. 1 and 2 illustrate generally the preferred embodiment of the apparatus of the present invention designated generally by the numeral 10.

In FIG. 1, there can seen a supporting base 11 having a pair of upstanding vertical supports extending upwardly therefrom so that the base 11 and the vertical supports 12, 13 define a machine frame. The upper shaft 14 carries a blade assembly 16 in the form of a cylindrical spindle that supports four upper rotary blades 18-21 each preferably circular in configuration having peripheral serrated edges including outer blades 18, 21 of larger diameter and inner blades 19, 20 of smaller diameter. A central dry roller 22 can be manufactured of rubber, for example, and would preferably be of slightly smaller diameter than the diameter of blades 19, 20. In FIG. 1, a crawfish tail 31 is shown which includes an outer tail portion having a lower ventral tail section 32 and an upper or dorsal tail section 33. Note thus in FIG. 1 that crawfish tails 31 are preferably fed into the apparatus in an upside down position. The inner meat product 34 is thus positioned generally between the ventral 32 and dorsal 33 portions of the crustacea tail shell.

Notice that the upper outermost blades 18, 21 have peripheral cutting edges 36 which can be, for example, serrated cutting edges, as best seen in FIG. 2 which overlap at the peripheral edges of crawfish tail 31. The overlapping of cutting blade 18 with blades 23, 24 and the overlapping of blade 21 with blades 28, 29 produces a sizzling action which cuts the dorsal shell 33 and ventral shell 32 sections of the crawfish tail 31 along its lateral edges and longitudinally along the crawfish tail as the shafts 14, 15 rotate. In this manner, the crawfish tail is fed through the apparatus and simultaneously cut along the sides of the crawfish tail and is a fashion which severs both the ventral 32 and dorsal 33 shell sections of the tail exoskeleton along the left and right side portions thereof. Thus, when the crawfish tail exoskeleton exits apparatus 10, and more particularly the cutting blade portions thereof, the shell has been cut and freely separates from the inner meat product 34.

Crawfish tails 31 are preliminarily fed to cutting blade assemblies 16, 17 by a pair of feed rollers 37, 38, including an upper cylindrical feed roller 37 and lower feed roller 38 having a concave annular surface 39 thereon. Rollers 37, 38 are rotatably mounted upon shafts 40, 41 respectively. A conveyor 42 which is driven by conveyor drive roller 43, and a second drive roller (not shown) can be used, for example, to convey crawfish tails 31 to drive rollers 37, 38. A sorter apparatus 44 receives crawfish tails 31 after they have been cut. Sorter 44 can support drive motor 45 upon pedestal 46. Motor 45 is used to drive belts 47, 48 which drive pulleys 57, 58 respectively associated with shafts 14, 15. The shaft 14 will also have a pulley 59 that engages drive belt 49 so that rotation of pulley 59 correspondingly rotates pulley 60 which drives shaft 40 and feed roller 37. In the preferred embodiment, the feed roller 38 can be an idler roller, for example.

Figure 5:
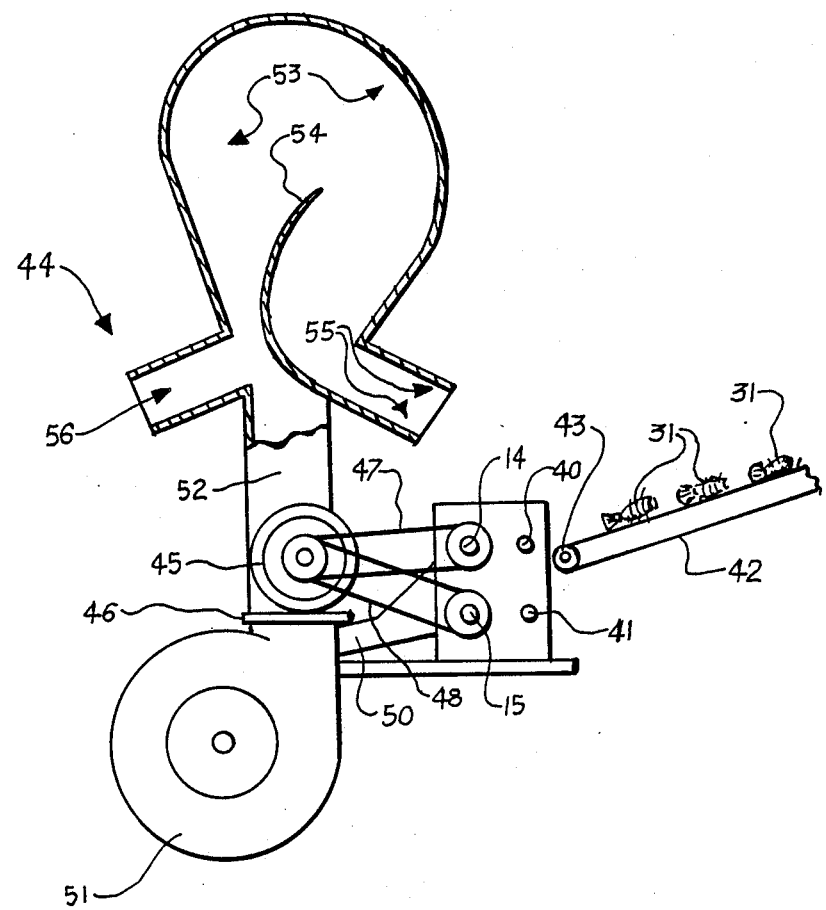
FIG. 5 is a side overall view of the preferred embodiment of the apparatus of the present invention.

Sorter 44 includes a blower 51 that forces air upwardly through vertical duct 52. Tails 31 enter vertical duct 52 via shoot 50, which is transversely positioned, as shown in FIG. 5. A separator 53 is positioned generally above vertical duct 52 and includes an enlarged space having a vein 54 which catches heavier material, typically the meat product 34 portion of crawfish tail 31 while the lighter dorsal and ventral shell portions of the tail pass beyond vein 54 and exit discharge 55. The heavier meat portion would typically exit outlet 56.

The foregoing description of the invention is illustrative and explanatory thereof, and various changes in the size, shape and materials, as well as in the details of the illustrated construction may be made without departing from the spirit of the invention.

What is claimed as invention is:

1. A crawfish peeling apparatus for separating the crawfish dorsal and ventral tail exoskeleton portions from the soft inner meat product comprising:
   a. a frame;
   b. scissor cutter means supported by the frame for making longitudinal edge cuts along the left and right sides of the crawfish tail by a scissor action of cooperating upper and lower blades positioned during cutting respectively to cut the dorsal and ventral tail shell sections so that the cuts extend substantially the full length of the crawfish tail;

c. feed means for advancing a crawfish tail to be peeled along a travel path that traverses the cutter means; and d. positioning means for aligning the crawfish tail and cutter means during cutting so that both the dorsal and ventral tail exoskeleton portions are cut by the cutter means.

2. The apparatus of claim 1 wherein the cutter means includes at least one pair of rotary blades.

3. The apparatus of claim 1, wherein there are left and right pairs of rotary cutter blades spaced on opposite edges of the crawfish tail during cutting, each pair including a dorsal blade and a ventural blade.

4. The apparatus of claim 1, wherein the cutter means comprises at least one rotary cutting blade.

5. The apparatus of claim 4, wherein the cutter means comprises a pair of overlapping rotary blades positioned to cut in a scissor fashion each rotating in a common plane that defines a cutting plane, each pair of blades having peripheral cutting edges which simultaneously scissor the crawfish tail exoskeleton on opposite lateral sides along the edges of the tail exoskeleton during cutting.

6. The apparatus of claim 1 further comprising a shaft and wherein the feed means includes at least one rotary member mounted for rotation on the shaft.

7. The apparatus of claim 6, wherein rotary shafts carry both the feed means and cutter means.

8. The apparatus of claim 1 further comprising means for separating the crawfish meat and exoskeleton portions after cutting.

9. A crawfish tail peeler for separating the hard upper and lower exoskeleton portions of the crawfish tail from the soft inner meat product, comprising:

a. a frame;

b. a pair of shafts carried by the frame;

c. first and second pairs of spaced apart overlapping rotary blades mounted for rotation on the shafts including a left side pairs of rotary blades mounted for rotation with the first and second shafts and a right side pair of shafts mounted for rotation with the first and second shafts, the left and right pairs of blades being positioned to simultaneously engage and cut the left and right edges of the crawfish tail being peeled by scissoring the crawfish tail with the overlapping blades; and d. means for rotating the blades with respect to the frame.

* * * * *